United States Patent
Lv et al.

(10) Patent No.: US 11,021,320 B2
(45) Date of Patent: Jun. 1, 2021

(54) FOLDABLE DOUBLE-DECK FRAME CONTAINER

(71) Applicants: NANTONG CIMC-SPECIAL TRANSPORTATION EQUIPMENT MANUFACTURE CO., LTD., Jiangsu (CN); CHINA INTERNATIONAL MARINE CONTAINERS (GROUP) LTD., Guangdong (CN); CIMC CONTAINERS HOLDING COMPANY LTD., Guangdong (CN)

(72) Inventors: Guoquan Lv, Jiangsu (CN); Xinlin Lu, Jiangsu (CN); Kwok Wai Ka Kelvin, Jiangsu (CN)

(73) Assignees: NANTONG CIMC-SPECIAL TRANSPORTATION EQUIPMENT MANUFACTURE CO., LTD., Jiangsu (CN); CHINA INTERNATIONAL MARINE CONTAINERS (GROUP) LTD., Guangdong (CN); CIMC CONTAINERS HOLDING COMPANY LTD., Guangdong (CN)

( * ) Notice: Subject to any disclaimer, the term of this patent is extended or adjusted under 35 U.S.C. 154(b) by 589 days.

(21) Appl. No.: 15/665,852

(22) Filed: Aug. 1, 2017

(65) Prior Publication Data

US 2018/0029791 A1    Feb. 1, 2018

(30) Foreign Application Priority Data

Aug. 1, 2016  (CN) .......................... 201620826282.5

(51) Int. Cl.
*B65D 88/00* (2006.01)
*B65D 85/68* (2006.01)
(Continued)

(52) U.S. Cl.
CPC .............. *B65D 88/005* (2013.01); *B60P 3/07* (2013.01); *B60P 3/08* (2013.01); *B65D 85/68* (2013.01);
(Continued)

(58) Field of Classification Search
CPC .... B65D 88/005; B65D 85/68; B65D 88/129; B65D 88/522; B65D 2585/6867;
(Continued)

(56) References Cited

U.S. PATENT DOCUMENTS 3,568,608 A * 3/1971 Taylor .................. B65D 88/022
108/53.1
3,620,388 A * 11/1971 Harry Mansson ... B65D 88/129
108/53.1
(Continued)

FOREIGN PATENT DOCUMENTS

CN       1708441 A      12/2005
CN       101224817 A     7/2008
(Continued)

*Primary Examiner* — James N Smalley
*Assistant Examiner* — Jennifer Castriotta
(74) *Attorney, Agent, or Firm* — Perspectives Law Group, Corp.

(57) ABSTRACT

The present invention discloses a foldable double-deck frame container, which comprises a first and second end rails parallel with each other and a first corner post, the first corner post is located at an end of the frame container, the first and second end rails are located between two of the first corner posts, and the second end rail is located above the first end rail, the frame container further comprises a second corner post rotatably connected with the top end of the first corner post so that the second corner post is movable between an vertical position and a folded position. The foldable double-deck frame container according to the present invention has a first corner post and a second corner post, and the second corner post is foldable so as to be folded (Continued)

during the backhaul process from being damaged. Such a frame container has a simpler configuration, lower cost of manufacture, convenience of recovery and a broad range of application.

19 Claims, 6 Drawing Sheets

(51) Int. Cl.
    *B65D 88/52*      (2006.01)
    *B60P 3/08*      (2006.01)
    *B60P 3/07*      (2006.01)
    *B65D 88/12*      (2006.01)
    *B65D 90/00*      (2006.01)

(52) U.S. Cl.
    CPC ......... *B65D 88/129* (2013.01); *B65D 88/522* (2013.01); *B65D 90/0026* (2013.01); *B65D 2585/6867* (2013.01)

(58) Field of Classification Search
    CPC ...... B65D 88/022; B65D 88/52; B65D 90/02; B65D 19/12; B65D 19/385; B60P 3/08; B60P 3/07
    USPC .............. 108/55.1, 53.1, 56.1; 220/1.5, 6, 7; 206/335
    See application file for complete search history.

(56) References Cited

U.S. PATENT DOCUMENTS

| | | | | |
|---|---|---|---|---|
| 4,240,359 A * | 12/1980 | Howe | ................. | B65D 88/522 108/53.1 |
| 4,319,732 A * | 3/1982 | Godfrey | ............... | B65D 88/022 108/53.1 |
| 4,353,520 A * | 10/1982 | Jansson | ................ | B65D 88/129 108/55.1 |
| 5,076,457 A * | 12/1991 | Marovskis | ......... | B65D 11/1833 220/1.5 |
| 5,169,011 A * | 12/1992 | Ebeling | ................ | B65D 88/522 108/53.1 |
| 5,644,992 A * | 7/1997 | Clive-Smith | ........ | B65D 88/129 108/53.1 |
| 6,513,442 B1 * | 2/2003 | Miller | .................. | B65D 88/022 108/53.1 |
| 6,655,300 B1 * | 12/2003 | Clive-Smith | ............ | B60P 3/08 108/53.5 |
| 7,827,655 B2 * | 11/2010 | Yi | ........................ | B65D 88/129 16/254 |
| 9,723,925 B1 * | 8/2017 | Tsai | ...................... | A47B 47/00 |
| 2005/0000834 A1 * | 1/2005 | Clive-Smith | ........ | B65D 88/005 206/335 |
| 2008/0210687 A1 * | 9/2008 | Clive-Smith | ........ | B65D 88/005 220/1.5 |
| 2015/0257530 A1 * | 9/2015 | Naka | ................. | A47B 47/0091 211/188 |

FOREIGN PATENT DOCUMENTS

| | | |
|---|---|---|
| CN | 201254363 Y | 6/2009 |
| CN | 201882452 U | 6/2011 |
| CN | 102556537 A | 7/2012 |
| CN | 103043331 A | 4/2013 |
| CN | 206375215 U | 8/2017 |
| DE | 10200982 A1 | 7/2003 |
| WO | 0069756 A1 | 11/2000 |

* cited by examiner

A

FOLDABLE DOUBLE-DECK FRAME CONTAINER

CROSS-REFERENCE TO RELATED APPLICATION(S)

This application claims the benefit of priority to Chinese Application No. 201620826282.5 filed on Aug. 1, 2016, and is herein incorporated by reference in its entirety.

BACKGROUND

The present invention generally relates to the field of containers, and more particularly, to a foldable double-deck frame container.

With existing vehicle carrier frame, each of them can only convey a deck of vehicles, while as to stacking two vehicle carrier frames for conveying or in the existing double-deck vehicle carrier frame, there are commonly the following problems: 1) The container body would be over-height and over-weight, since during the transportation process of a single frame, if the international through transportation is required to be satisfied, it is needed to design the frame in accordance with the design strength of the container in order to satisfy the strength requirement during the transportation process, such as lateral stiffness, stacking and the like, therefore, each single frame is required to retain the upper fascia board, the lower fascia board and corresponding corner posts having corresponding strength, and when the strength is satisfied, the road or railroad departments further has restriction upon the height, width and the like of the container body, in this way, while the external dimensions and internal vehicle transport space are ensured, the strength requirements also need to be guaranteed, and generally, it is only possible to increase the plate thickness of the corresponding parts which makes the vehicle carrier frame more cumbersome; 2) The transportation expenses are increased, since the higher height of the container body correspondingly causes increased transportation expenses.

SUMMARY

To solve the above technical problems, one aspect of the present invention provides a foldable double-deck frame container, characterized in that, the frame container comprises a first and second end rails parallel with each other and a first corner post, the first corner post is located at an end of the frame container, the first and second end rails are located between two of the first corner posts, and the second end rail is located above the first end rail, Wherein the frame container further comprises a second corner post rotatably connected with the top end of the first corner post so that the second corner post is movable between an vertical position and a folded position.

Alternatively, the height of the second end rail varies along the length of the second end rail.

Alternatively, the height at the end of the second end rail is greater than the height at the middle of the second end rail.

Alternatively, the second end rail is configured to be formed by integrally molding or tailor welding.

Alternatively, the width of the first corner post varies along the height of the first corner post.

Alternatively, the width at the bottom of the first corner post is greater than the width at the middle of the first corner post.

Alternatively, the width at the top of the first corner post is greater than the width at the middle of the first corner post.

Alternatively, the first corner post is configured to be formed by integrally molding or tailor welding.

Alternatively, the width of the second corner post varies along the height of the second corner post.

Alternatively, the width at the bottom of the second corner post is greater than the width at the middle of the second corner post.

Alternatively, the second corner post is configured to be formed by integrally molding or tailor welding.

Alternatively, the second corner post is substantially horizontal in a state where the second corner post is in the folded position.

Alternatively, the top end of the first corner post has a top connector to which the second corner post is rotatably connected.

Alternatively, the top of the top connector has a connection structure for connecting with the bottom corner fitting.

Alternatively, the top connector has a groove facing the inside of the frame container in the length direction of the frame container, the groove is used to receive the second corner post in the state of being the vertical position, the groove form a U-shaped opening on the top surface of the top connector, and the U-shaped opening can be connected with the bottom corner fitting.

Alternatively, the bottom end of the second corner post has a hole, and in a state where the second corner post is in the vertical position, the second corner post is connected by the top connector through a retainer pin passing through the hole.

Alternatively, the frame container also has a first frame and a auxiliary spring structure provided on the first frame, the first frame comprises the first corner post, the first end rail, the second end rail and a first side rail between two ends of the first frame, the auxiliary spring structure is connected to the second corner post so as to assist in overturning the second corner post.

Alternatively, the auxiliary spring structure comprises an auxiliary spring and a wire rope connected with the auxiliary spring, the bottom end of the second corner post is provided with a wire rope connecting portion by which the second corner post is connected with the wire rope, and when the second corner post is in the folded position, the wire rope connecting portion is below the second corner post.

Alternatively, the auxiliary spring structure further comprises a guide wheel and a tension wheel, the guide wheel is used to change the direction of the wire rope, the tension wheel is located between the guide wheel and the wire rope connecting portion, and when the second corner post is in the vertical position, the wire rope is strained through the tension wheel, and when the second corner post is in the folded position, the wire rope is strained between the wire rope connecting portion and the guide wheel.

Alternatively, the top of the second corner post is detachably provided with a third end rail.

Alternatively, the frame container further comprises a retainer means for securing the second corner post in the folded position.

Alternatively, the bottom end of the first corner post is provided with a bottom corner fitting.

Alternatively, the top end of the second corner post is provided with a top corner fitting.

Alternatively, the top end of the second corner post is provided with a top corner fitting, the first side rail is provided with a retainer means for securing the top corner fitting of the second corner post in the folded position.

The foldable double-deck frame container according to the present invention has a first corner post and a second corner post, and the second corner post is foldable so as to be folded during the backhaul process from being damaged. Such a frame container has a simpler configuration, lower cost of manufacture, convenience of recovery and a broad range of application.

BRIEF DESCRIPTION OF THE DRAWINGS

In order that the advantages of the present invention may be more readily understood, the present invention as described above briefly will be described in more detail while referring the specific embodiments illustrated in the drawings. It is to be understood that these drawings illustrate only exemplary embodiments of the invention and are therefore not to be considered limiting of the scope of the invention, and that the invention is described and illustrated by additional features and details. In which.

REFERENCE NUMERALS

| | |
|---|---|
| 10: The first end rail | 20: The second end rail |
| 21: The middle of the second end rail | 22: The end of the second end rail |
| 30: The third end rail | 40: The first corner post |
| 41: The middle of the first corner post | 42: The top of the first corner post |
| 43: The bottom of the first corner post | 50: The second corner post |
| 51: The middle of the second corner post | 52: The bottom of the second corner post |
| 53: Hole | 54: Wire rope connecting portion |
| 55: Axis of rotation | 60: Top connector |
| 61: Top surface | 62: U-shaped opening |
| 63: Retainer pin | 71: Auxiliary spring |
| 72: Guide wheel | 73: Tension wheel |
| 74: Wire rope | 741: The first end of the wire rope |
| 742: The second end of the wire rope | 81: Top corner fitting |
| 82: Bottom corner fitting | 90: The first side rail |
| 100: Frame container | 200: Vehicle |
| 210: Tire | |

DETAILED DESCRIPTION

In the following discussion, details are given to provide a more thorough understanding of the present invention. However, it will be understood by those skilled in the art that the present invention may be practiced without one or more of these details. In a particular example, some of the technical features known in the art are not described in detail in order to avoid confusion with the present invention. It should be noted that the terms "upper", "lower", "front", "rear", "left", "right" and the like are used herein for illustrative purposes only and are not intended to be limiting.

Figure 1:
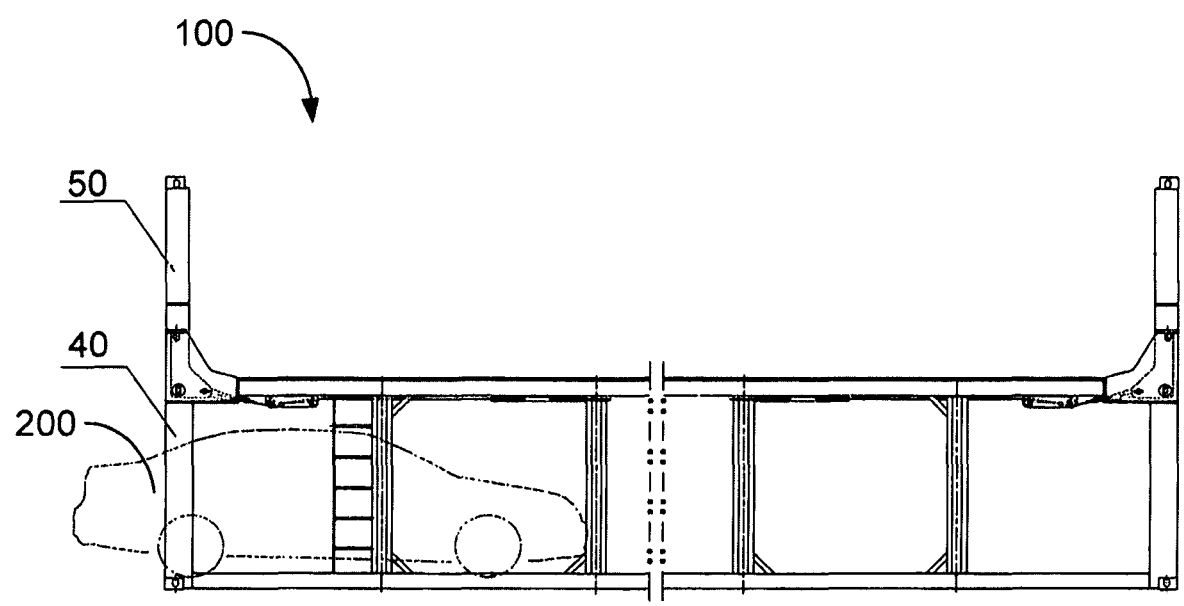
FIG. 1 is a front schematic view of a foldable double-deck frame container according to the present invention.
Figure 2:
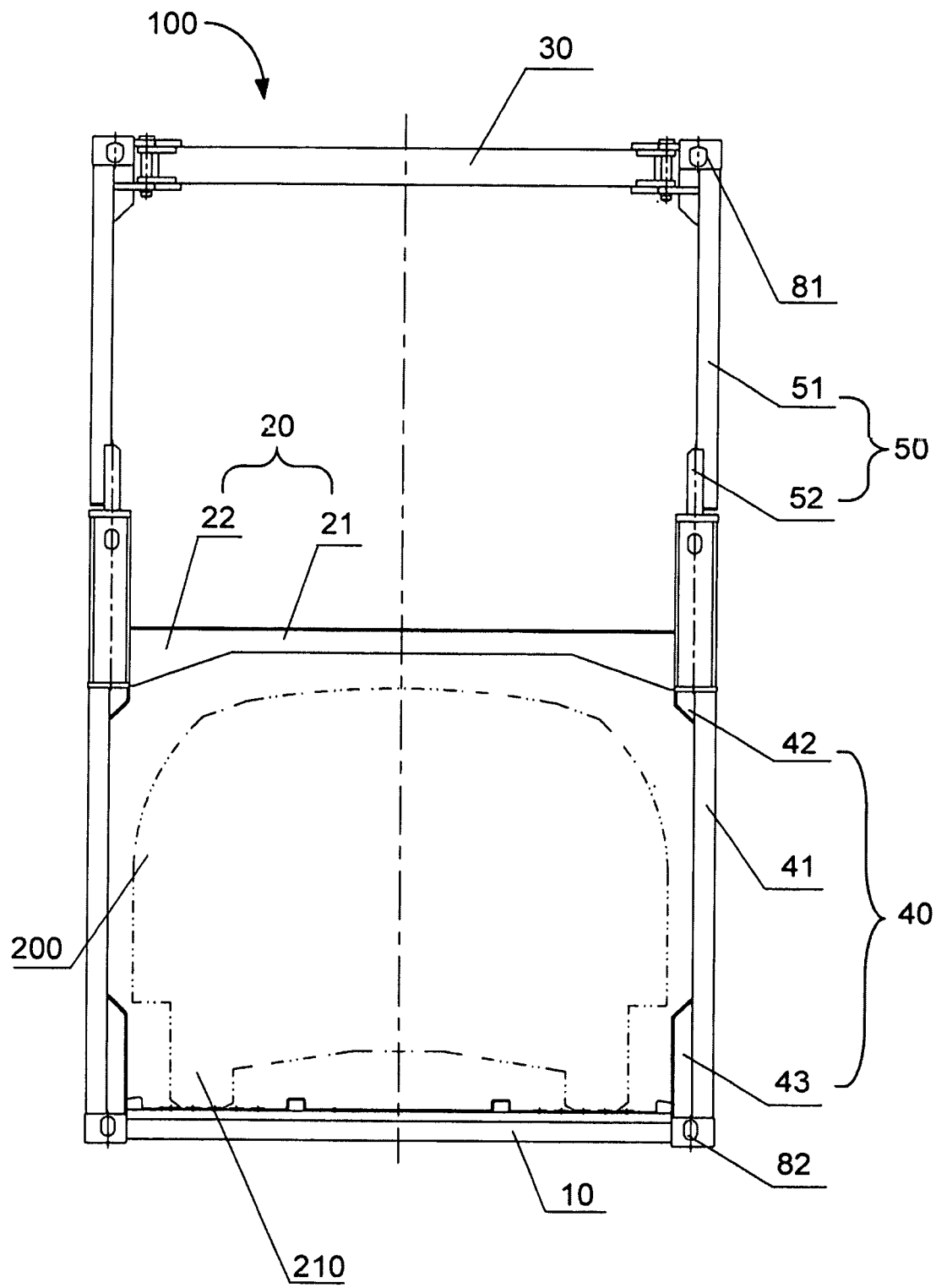
FIG. 2 is a left schematic view of the frame container shown in FIG. 1, where the second corner post is in an vertical position.

Referring to FIGS. 1 and 2, the present invention provides a foldable double-deck frame container 100, the frame container 100 comprises a first and second end rails 10, 20 parallel with each other and a first corner post 40, the first corner post 40 is located at an end of the frame container 100, the first and second end rails 10, 20 are located between two of the first corner posts 40, and the second end rail 20 is located above the first end rail 10.

The frame container 100 further comprises a bottom plate for carrying cargos, such as vehicles 200; four first corner posts 40 are provided respectively at four corners of the bottom plate; two pairs of the first end rails 10 and second end rails 20 may be provided at the ends of the bottom plate respectively, thus, the frame container 100 forms the lower-deck frame. The lower-deck frame may further comprise a first side rail 90 connected between the two second end rails 20. Naturally, in order to also carry vehicles above the lower-deck frame (for example, the upper-deck frame), the top of the lower-deck frame may be provided with a top plate acting as the bottom plate of the upper-deck frame.

Furthermore, the frame container 100 further comprises a second corner post 50 rotatably connected with the top end of the first corner post 40 so that the second corner post 50 is movable between an vertical position and a folded position. In the state where the second corner post 50 is in the vertical position, the second corner post 50 and the first corner post 40 are substantially on the same straight line, thus other containers, such as the frame container 100, can be stacked on the second corner post 50, or alternatively, can be lifted using conventional spreaders. While in the state where the second corner post 50 is in the folded position, the second corner post 50 may be overturned to a substantially horizontal position so that it is possible to prevent the same from interfering with other components or apparatus during the transportation and thus being damaged, and by this time, the size of the frame container 100 can satisfy conventional dimension requirements of the container, thus avoiding the inconvenience caused by special size during the transportation.

Turning now to FIG. 2, the height of the second end rail 20 may vary along the length of the second end rail 20, as shown in the figure. Further, the height at the end 22 of the second end rail 20 (the end in the length direction) is greater than the height at the middle 21 of the second end rail 20, such that the second end rail 20 has an arcuate shape, an arched shape or a shape having a trapezoid groove, and the like, thus the arc-like positional space at the top of the vehicles loaded in the lower-deck frame can be utilized, while increasing the strength of the second end rail 20, the normal shipment of the vehicles will not be hampered. The second end rail is configured to be formed by integrally molding or tailor welding as required.

It should be noted that the term "height" as used herein refers to the direction consistent with the height of the frame container. The length of the second end rail refers to the direction consistent with the width of the frame container. The width of the first and second corner posts refers to the direction consistent with the width of the frame container.

Referring to FIG. 2 again, the width of the first corner post 40 may vary along the height of the first corner post 40. Further, the width at the bottom 43 of the first corner post 40 is greater than the width at the middle 41 of the first corner post 40. Thus, the space at the tire 210 of the lower vehicle can be utilized. Similarly and alternatively, the width at the top 42 of the first corner post 40 may be greater than the width at the middle 41 of the first corner post 40. Thus, the arcuate positional space at the top of the lower vehicle can be utilized. The first corner post 40 also can comprise a shape, such an arcuate shape, an arched shape or a shape having a trapezoid groove, and the like, by which the normal shipment of vehicles will not be hampered while increasing the strength. The first corner post 40 can also be configured to be formed by integrally molding or tailor welding.

Similar to the first corner post 40, the width of the second corner post 50 can vary along the height of the second corner post 50. Further, the width at the bottom 52 of the second corner post 50 is greater than the width at the middle 51 of the second corner post 50. Thus, the space at the tire of the vehicles (not shown) carried by the upper-deck frame can be utilized. Alternatively, the second corner post 50 can also be configured to be formed by integrally molding or tailor welding.

Alternatively, in the state where the second corner post 50 is in the folded position, the second corner post 50 is substantially horizontal. The folded second corner post 50 is approximately horizontally placed (essentially parallel with the first side rail 90), thus, it is possible to prevent the above container body from impacting the corner post and damaging the same during the backhaul process.

Furthermore, referring to FIGS. 2 to 5, the top end of the first corner post 40 has a top connector 60 to which the second corner post 50 is rotatably connected. The top connector 60 may be configured to be triangular or L-shaped, the bottom of the second corner post 50 is provided in the top connector 60.

For example, in the illustrated embodiments, the top connector 60 has a groove facing the inside of the frame container 100 in the length direction of the frame container 100, the groove is used to receive the second corner post 50 in the state of being in the vertical position, the groove forms a U-shaped opening 62 on the top surface 61 of the top connector 60, and the U-shaped opening can be connected with the bottom corner fitting 82. The bottom end of the second corner post 50 has a hole 53, and in a state where the second corner post 50 is in the vertical position, the second corner post 50 is connected to the top connector 60 through a retainer pin 63 passing through the hole 53.

Alternatively, the top of the top connector 60 has a connection structure for connecting with the bottom corner fitting of a standard container. Such a connection structure may be a standard top corner fitting 81.

Furthermore, the frame container 100 also has a first frame and an auxiliary spring structure provided on the first frame, the first frame comprises a first corner post 40, a first end rail 10, a second end rail 20 and a first side rail 90 located between two ends of the first frame, the auxiliary spring structure may comprise an auxiliary spring 71 and a wire rope 74 connected thereto. The auxiliary spring 71 may be arranged on the first frame, and connected to the second corner post 50 via the wire rope 74 so as to assist the overturning of the second corner post 50.

Figure 3:
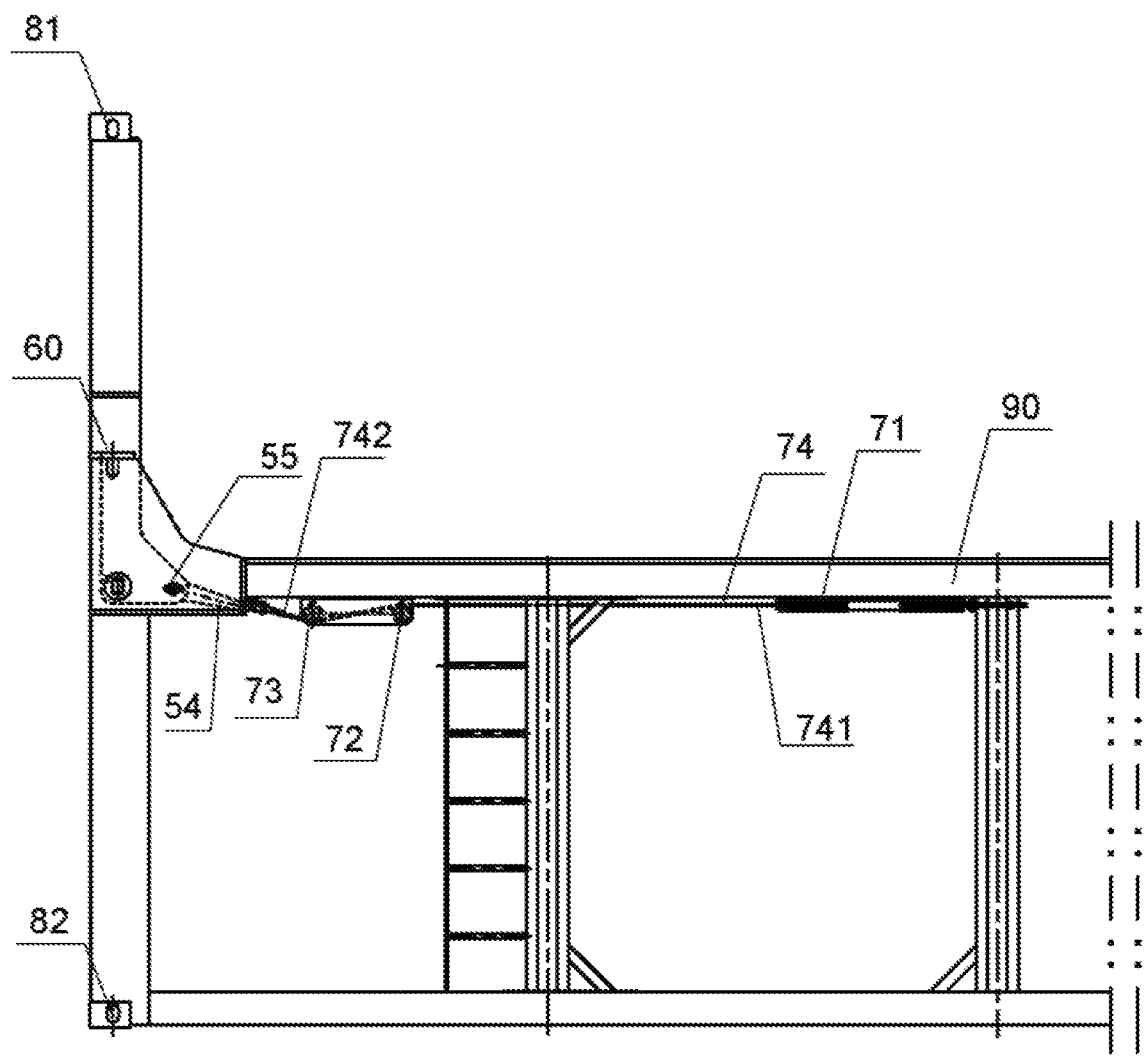
FIG. 3 is a partial enlarged view of the frame container shown in FIG. 1.
Figure 4:
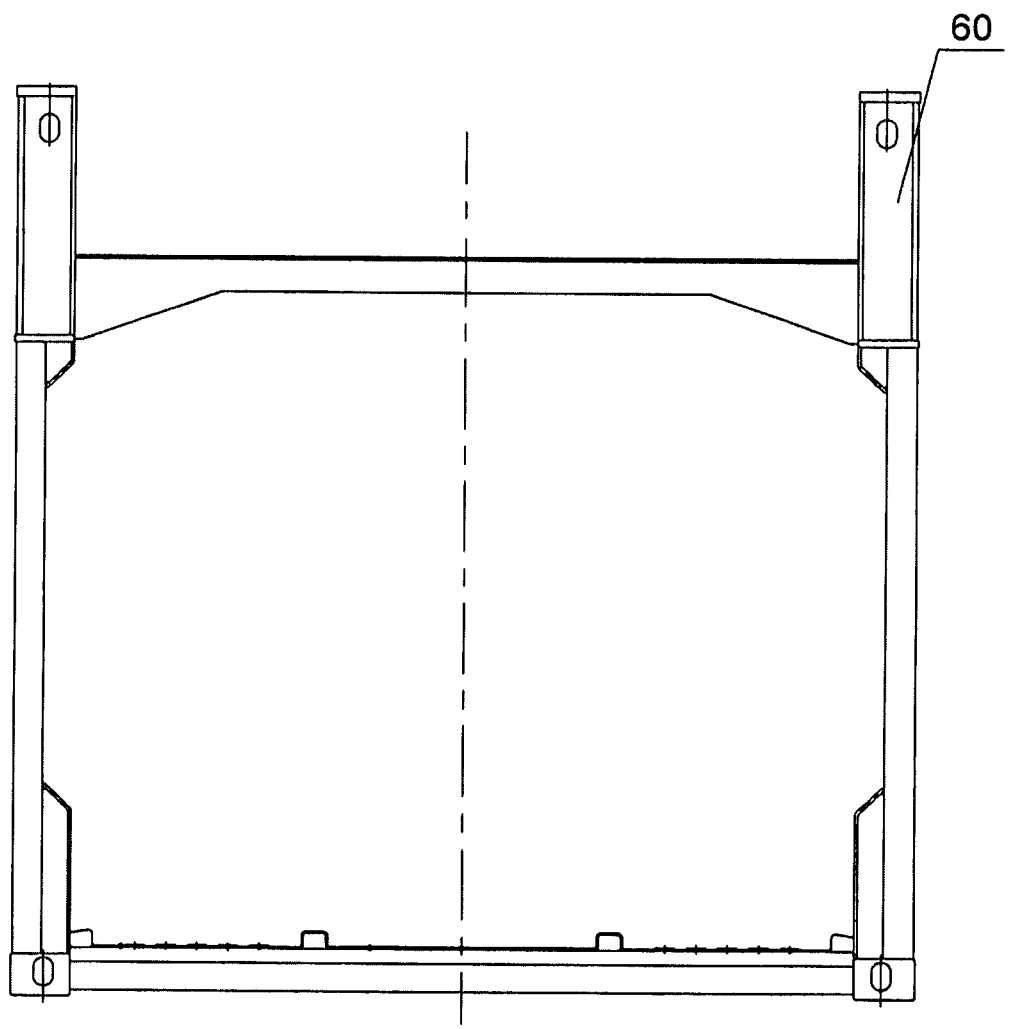
FIG. 4 is another left schematic view of the frame container shown in FIG. 1, where the second corner post is in a folded position.
Figure 5:
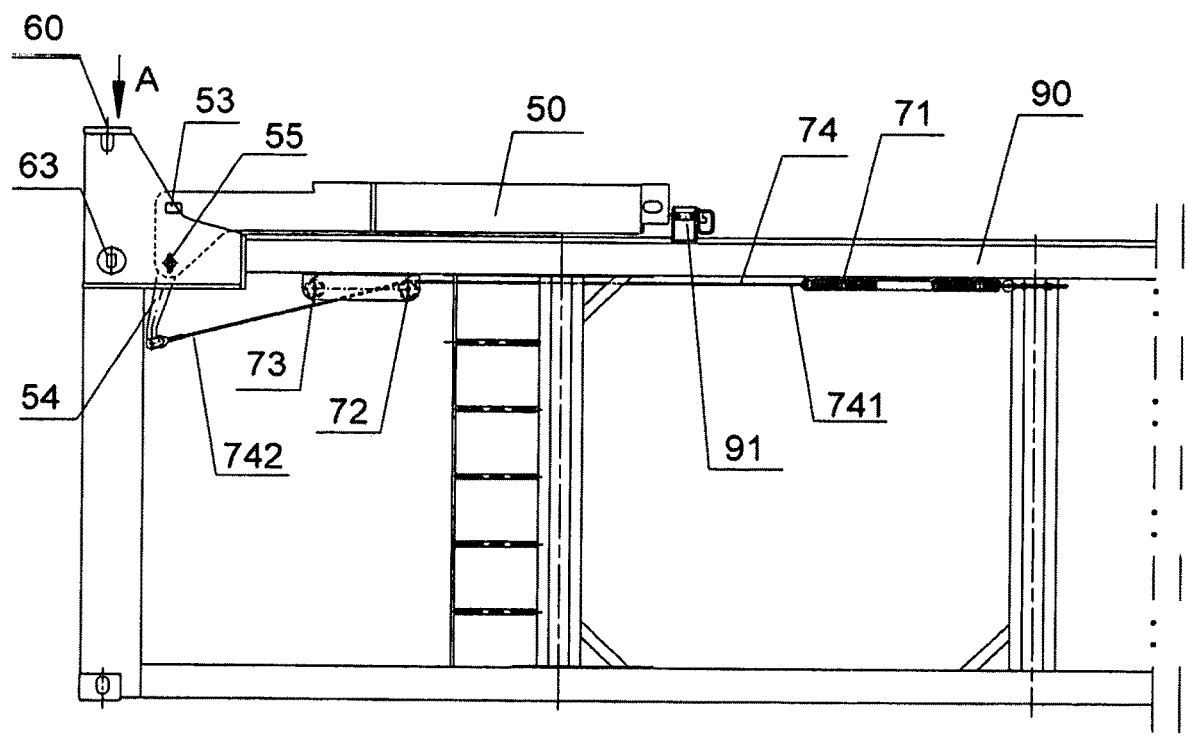
FIG. 5 is a front schematic view of the frame container shown in FIG. 4.
Figure 6:
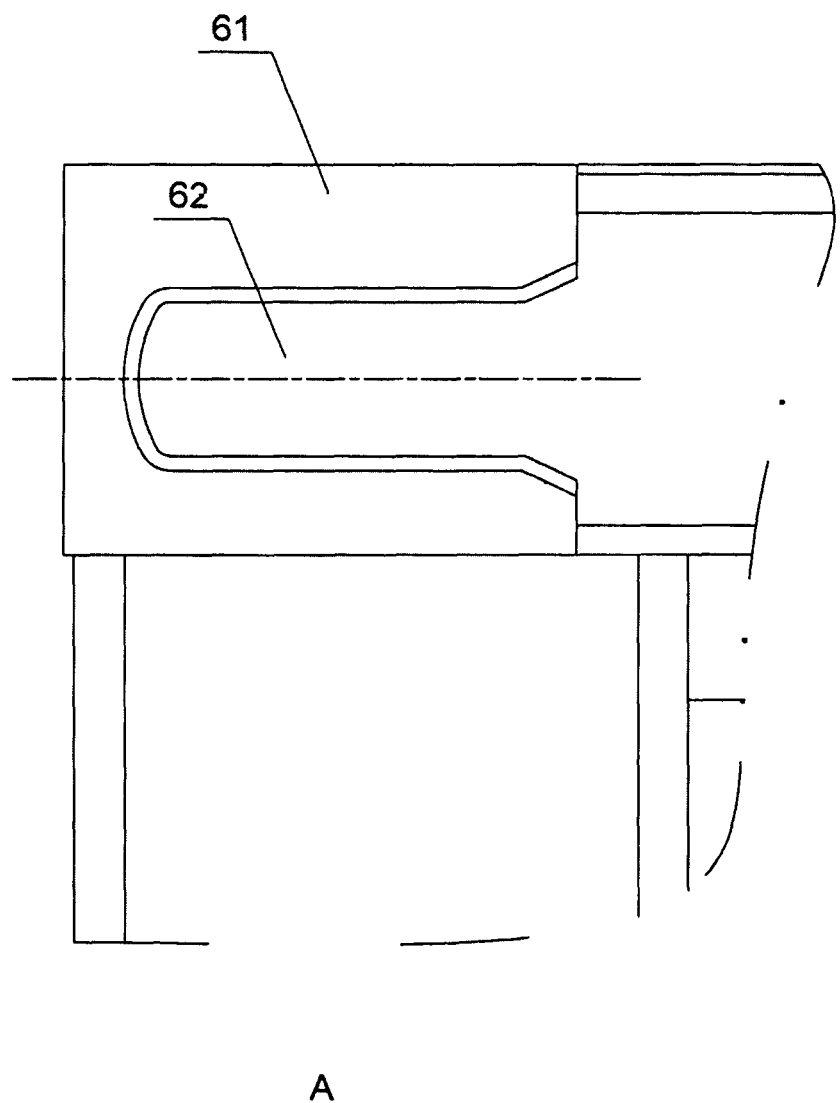
FIG. 6 is a view from arrow A of FIG. 5.

Specifically, as shown in FIGS. 3 and 5, the first end 741 of the wire rope 74 is connected to the auxiliary spring 71, while the second end 742 of the wire rope 74 is connected to the wire rope connecting portion 54 provided at the bottom end of the second corner post 50. When the second corner post 50 is in the folded position, the wire rope connecting portion 54 is located below the second corner post 50.

Furthermore, the auxiliary spring structure further comprises a guide wheel 72 and a tension wheel 73 provided on the first frame. Among others, the guide wheel 72 is used to contact with the wire rope 74 in order to change the direction of the wire rope 74. While the tension wheel 73 may be located between the guide wheel 72 and the second end 742, so that when the second corner post 50 is in the vertical position as shown in FIG. 3, the tension wheel 73 changes the direction of the wire rope 74 located between the guide wheel 72 and the wire rope connecting portion 54, thus the wire rope 74 is strained, thereby it is possible to prevent the auxiliary spring 71 and the wire rope 74 from being in a relaxed state when the second corner post 50 is in the vertical position, thus avoiding the hanging of the wire rope 74 as well as other potential safety hazards during the transportation process.

While when the second corner post 50 is in the folded position as shown in FIG. 5, the wire rope 74 is not strained via the tension wheel 73, stated differently, the wire rope 74 between the wire rope connecting portion 54 and the guide wheel 72 is strained due to the distance between the wire rope connecting portion 54 and the guide wheel 72.

A third end rail 30 may also be provided between the tops of two second corner posts 50, and the third end rail 30 is detachably connected to the second corner post 50. Thus, when two or more frame containers 100 are connected in the length direction, respective upper-deck frames of the plurality of frame containers 100 may be connected into a substantially horizontal plane, in this way, when the third end rail is detached from the top of the second corner post 50, respective upper-deck frames of the plurality of frame containers 100 may achieve a barrier-free access, so that the vehicle at this point can be moved directly from the second deck (the upper-deck) of one frame container 100 to the upper-deck frame of another frame container, thus reducing the number of times for bridging the second-deck platforms when loading and unloading the vehicles.

Furthermore, the frame container 100 may further comprise a retainer means 91 for securing the second corner post 50 in the folded position. Alternatively, the bottom end of the first corner post 40 is provided with a bottom corner fitting 82. Also, the top end of the second corner post 50 is provided with a top corner fitting 81.

For example, the top end of the second corner post 50 is provided with a top corner fitting 81, the first side rail 90 is provided with a retainer means for securing the top corner fitting 81 of the second corner post 50 in the folded position, which can secure firmly the second corner post 50 onto the first side rail 90 in turn.

According to the frame container 100 of the present invention, the second corner post is configured to be foldable, and in order to guarantee corresponding strength, the first corner post, the second corner post and the second end rail may employ a configuration of variable cross-section, so that the joint of the first corner post with the second end rail and the joint of the second corner post with the second end rail have an enlarged cross-sectional area, making the stress decreased. While for the middle position of the first corner post, the second corner post and the second end rail, its cross-sectional area should be adapted to the transportation of the vehicles. At the same time, the second corner post is provided with a buffer spring such that the second corner post can be operated by one man without requiring additional spreaders.

Under the restriction of a certain external dimension and requirements of the internal dimension for the frame container 100, the first corner post, the second corner post and the second end rail etc. employ a design of variable cross-section, in which the sectional area at respective ends (dimension) is greater than the sectional area at the middle, thus making the best of the vehicular space and guaranteeing the strength of the frame.

Unless defined otherwise, the technical and scientific terms used herein have the same meaning as commonly understood by one of ordinary skilled person in the art to which this invention pertains. The terminology used herein is for the purpose of describing particular implementations only and is not intended to be limiting of the present invention. As used herein, terms such as "parts" are used to denote a single part or a combination of several parts. The terms such as "assemble", "provide" and the like appeared herein may mean that one component is directly attached to another component, or that one component is attached to another component through a middleware. The features described herein in one embodiment may be applied to another embodiment, alone or in combination with other features, unless the feature is not applicable in the other embodiment or otherwise described.

The present invention has been described by way of the above embodiments, but it is to be understood that the above-described embodiments are for illustrative and explanatory purposes only and are not intended to limit the invention to the scope of the described embodiments. It will be understood by those skilled in the art that various modifications and variations can be made in the light of the teachings of the present invention, which fall within the scope of the invention as claimed.

What is claimed is:

1. A foldable double-deck frame container, characterized in that, the frame container comprises first and second end rails parallel with each other and a plurality of first corner posts, the plurality of first corner posts are located at an end of the frame container, the first and second end rails are located between two instances of the first corner posts, and the second end rail is located above the first end rail, wherein the frame container further comprises a second corner post rotatably connected with the top end of the first corner post so that the second corner post is movable between a vertical position and a folded position; and wherein the top of the second corner post is detachably provided with a third end rail;

the frame container also has a first frame and an auxiliary spring structure provided on the first frame, the first frame comprises the first corner post, the first end rail, the second end rail and a first side between two ends of the first frame, the auxiliary spring structure is connected to the second corner post so as to assist in overturning the second corner post;

the top end of the second corner post is provided with a top corner fitting, the first side rail is provided with a retainer means for securing the top corner fitting of the second corner post in the folded position.

2. The frame container according to claim 1, characterized in that, the height of the second end rail varies along the length of the second end rail.

3. The frame container according to claim 2, characterized in that, the height at the end of the second end rail is greater than the height at the middle of the second end rail.

4. The frame container according to claim 1, characterized in that, the second end rail is configured to be formed by integrally molding or tailor welding.

5. The frame container according to claim 1, characterized in that, the width at the top of the first corner post is greater than the width at the middle of the first corner post.

6. The frame container according to claim 1, characterized in that, the first corner post is configured to be formed by integrally molding or tailor welding.

7. The frame container according to claim 1, characterized in that, the width of the second corner post varies along the height of the second corner post.

8. The frame container according to claim 7, characterized in that, the width at the bottom of the second corner post is greater than the width at the middle of the second corner post.

9. The frame container according to claim 7, characterized in that, the second corner post is configured to be formed by integrally molding or tailor welding.

10. The frame container according to claim 1, characterized in that, the second corner post is substantially horizontal in a state where the second corner post is in the folded position.

11. The frame container according to claim 10, characterized in that, the top end of the first corner post has a top connector to which the second corner post is rotatably connected.

12. The frame container according to claim 11, characterized in that, the top of the top connector has a connection structure for connecting with a bottom corner fitting.

13. The frame container according to claim 12, characterized in that, the top connector has a groove facing the inside of the frame container in a length direction of the frame container, the groove is used to receive the second corner post in the state of being the vertical position, the groove forms an U-shaped opening on the top surface of the top connector.

14. The frame container according to claim 11, characterized in that, the bottom end of the second corner post has a hole, and in a state where the second corner post is in the vertical position, the second corner post is connected to the top connector through a retainer pin passing through the hole.

15. The frame container according to claim 1, characterized in that, the auxiliary spring structure comprises an auxiliary spring and a wire rope connected with the auxiliary spring, the bottom end of the second corner post is provided with a wire rope connecting portion by which the second corner post is connected with the wire rope, and when the second corner post is in the folded position, the wire rope connecting portion is below the second corner post.

16. The frame container according to claim 15, characterized in that, the auxiliary spring structure further comprises a guide wheel and a tension wheel, the guide wheel is used to change the direction of the wire rope, the tension wheel is located between the guide wheel and the wire rope connecting portion, and when the second corner post is in the vertical position, the wire rope is strained through the tension wheel, and when the second corner post is in the folded position, the wire rope is strained between the wire rope connecting portion and the guide wheel.

17. The frame container according to claim 1, characterized in that, the bottom end of the first corner post is provided with a bottom corner fitting.

18. The frame container according to claim 1, characterized in that, the width of the first corner post varies along the height of the first corner post.

19. The frame container according to claim 18, characterized in that, the width at the bottom of the first corner post is greater than the width at the middle of the first corner post.

* * * * *